UNITED STATES PATENT OFFICE 2,658,912

ALPHA-METHYL GLUTAMIC ACID AND SALTS AND PROCESS FOR PREPARATION

Karl Pfister III, Westfield, N. J., and William J. Leanza, Staten Island, N. Y., assignors to Merck & Co., Inc., Rahway, N. J., a corporation of New Jersey No Drawing. Application December 28, 1951, Serial No. 263,968

6 Claims. (Cl. 260—534)

This invention is concerned with the novel compound, α-methylglutamic acid, and processes useful for the preparation of this new product.

Our novel compound is a white crystalline substance having a melting point of about 168–170° C. with decomposition and having the following structural formula:

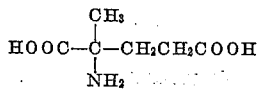

α-Methylglutamic acid and its salts possess valuable antibacterial properties. In addition, this compound has been found to be antagonistic to glutamic acid, i. e., it interferes with the biologically important reaction of this naturally occurring amino acid.

It is an object of the present invention to provide the novel compound, α-methylglutamic acid. A further object is to provide processes useful for preparing this compound by the hydrolysis of levulinic hydantoin. Other objects will be apparent from the detailed description hereinafter provided.

In accordance with the present invention, we have found that α-methylglutamic acid is readily prepared by the hydrolysis of levulinic hydantoin. Although this hydrolysis can be readily accomplished by heating the hydantoin with acid or alkali, we have found that it is most conveniently effected by reacting levulinic hydantoin in aqueous solution with a strong base such as an alkali metal or alkaline earth metal hydroxide, for example, sodium hydroxide, potassium hydroxide, barium hydroxide and the like. In carrying out our invention in accordance with a preferred embodiment thereof, the levulinic hydantoin is hydrolyzed by refluxing it with an aqueous solution of sodium hydroxide. After the hydrolysis is completed, the product is readily recovered by acidifying the resulting solution and concentrating the acidified solution. If desired, the α-methylglutamic acid can be purified by recrystallization from aqueous alcohol to obtain the compound in substantially pure form.

The levulinic hydantoin used as a starting material for the preparation of α-methylglutamic acid is readily prepared by reacting an alcoholic solution of levulinic acid with an aqueous solution of sodium cyanide in the presence of solid ammonium carbonate. The hydantoin is recovered from the resulting reaction mixture by acidifying the reaction mixture, boiling to remove hydrogen cyanide and cooling the acidified solution to precipitate the levulinic hydantoin. If desired, the hydantoin can be purified by recrystallization from a suitable solvent such as a mixture of ethyl alcohol and ethyl acetate to prepare the product in substantially pure form.

The following example is presented to illustrate a specific process of carrying out our invention.

EXAMPLE (A) *Preparation of levulinic hydantoin from levulinic acid*

To a solution of 116.1 g. of levulinic acid in 500 cc. of ethyl alcohol in a 2 l. Erlenmeyer flask fitted with a ¾" diameter air condenser 30" long was added a solution of 73 g. of sodium cyanide in 300 cc. of water and 455 g. of lump ammonium carbonate. The flask was placed in a constant temperature bath and heated at 58–60° C. for 48 hours; the solid ammonium carbonate forming in the condenser being occasionally washed out with water. The condenser was then removed and the excess ammonium carbonate was boiled off on a steam bath and the evaporated solvent replaced with water. The resulting solution was transferred to a 4 l. beaker, acidified with 1 l. of 18% hydrochloric acid and boiled to remove hydrogen cyanide. On cooling the resulting solution in an ice bath, levulinic hydantoin was precipitated. The product after recrystallization from ethyl alcohol had a melting point of 158–160° C. After recrystallization from a 1:1 mixture of ethyl alcohol and ethyl acetate, the pure levulinic hydantoin having a melting point of 159–160° C. was obtained.

(B) *Hydrolysis of levulinic hydantoin to α-methylglutamic acid*

A solution of 52 g. of levulinic hydantoin in 300 cc. of water containing 42 g. of sodium hydroxide was refluxed over night. The resulting solution contained the sodium salt of α-methylglutamic acid. The solution was acidified with hydrochloric acid until it became cloudy and the resulting siliceous precipitate was removed by filtration and the filtrate was vacuum concentrated to a slurry of crystals. At this point, 50 cc. of concentrated hydrochloric acid was added and the precipitated sodium chloride filtered off. The filtrate was concentrated to a syrup, diluted with water, and the evaporation repeated to remove excess hydrochloric acid. The syrup so obtained was dissolved in 50 cc. of water and 200 cc. of ethyl alcohol and neutralized with aniline employing Congo red as the indicator. A white granular precipitate of α-methylglutamic acid formed which was filtered off to obtain 13 g. of product. About 100 cc. of ethyl alcohol was added to the resulting filtrate and the resulting solution allowed to stand in the ice-box overnight. An additional 7 g. of α-methylglutamic acid precipitated from the solution and was recovered by filtration. The α-methylglutamic acid obtained melted at 162–165° C. with decomposition. After one recrystallization from water-alcohol, a product free of inorganic material was obtained having a melting point of 163–164° C. with decomposition. A subsequent recrystallization from water gave material of melting point 168–170° C. which was not altered by further recrystallization.

Calculated for $C_6H_{11}NO_4$: C, 44.71; H, 6.88; N, 8.69. Found: C, 44.86; H, 6.85; N, 8.40.

Various salts of α-methylglutamic acid can be prepared by reacting the acid with a base in accordance with methods well known in the art.

α-Methylglutamic acid showed in vitro activity against several gram positive and gram negative organisms, including *Shigella dysenteriae, E. typhosa, E. coli, Staphylococcus aureus, Streptococcus pyogenes* C–203 and *D. pneumoniae* I–37.

In addition to its antibacterial properties, α-methylglutamic acid is able specifically to inhibit decarboxylation of glutamic acid by the enzyme glutamic decarboxylase. This property of α-methylglutamic acid was indeed unexpected since there is no apparent reason why an α-methyl should prevent decarboxylation and even less idea as to why this product should be able to prevent the enzyme from decarboxylating its normal substrate L-glutamic acid. Since this reaction of glutamic acid, removal of the α-carboxyl, has been demonstrated to occur in brain tissue, the inhibitory analog, α-methylglutamic acid, is a useful tool in elucidation of brain metabolism.

Various changes and modifications may be made in carrying out the present invention without departing from the spirit and scope thereof. Insofar as these changes and modifications are within the purview of the annexed claims, they are to be considered as part of our invention.

We claim:

1. A compound from the group consisting of α-methylglutamic acid and salts thereof produced by reaction with a base.
2. α-Methylglutamic acid.
3. The sodium salt of α-methylglutamic acid.
4. The process which comprises hydrolyzing levulinic hydantoin to form α-methylglutamic acid.
5. The process which comprises heating levulinic hydantoin with a base to form α-methylglutamic acid.
6. The process which comprises heating levulinic hydantoin with an aqueous solution of sodium hydroxide to form α-methylglutamic acid.

KARL PFISTER, III.
WILLIAM J. LEANZA.

No references cited.